United States Patent [19]

Chigiotti

[11] 3,822,632
[45] July 9, 1974

[54] AUTOMATIC APPARATUS FOR SCARFING SEMIFINISHED PRODUCTS

[75] Inventor: Mario Chigiotti, Genova, Italy

[73] Assignee: Bocami di Garibaldo Attillio S.p.A., Via Adamello, Santa Maria Rossa di Garbagnate, Italy

[22] Filed: Sept. 20, 1971

[21] Appl. No.: 181,661

[30] Foreign Application Priority Data
Sept. 24, 1970 Italy.................................. 30177/70

[52] U.S. Cl. ................ 90/13 R, 144/2 M, 144/3 R, 90/62 R
[51] Int. Cl. ............................................ B23c 3/14
[58] Field of Search........ 90/18, 42, 15, 11 R, 62 R, 90/13 R; 144/2 M, 3 R; 83/371, 11; 234/63, 64, 89; 266/23 R

[56] References Cited
UNITED STATES PATENTS

| | | | |
|---|---|---|---|
| 1,549,691 | 8/1925 | Steper | 144/2 M |
| 2,644,495 | 7/1953 | Bennett et al. | 144/2 M |
| 3,329,181 | 7/1967 | Buss et al. | 83/371 X |
| 3,452,789 | 7/1969 | Roberts, Jr. et al. | 144/2 M |

FOREIGN PATENTS OR APPLICATIONS

| | | | |
|---|---|---|---|
| 853,088 | 11/1960 | Great Britain | 266/23 R |

Primary Examiner—Andrew R. Juhasz
Assistant Examiner—Z. R. Bilinsky
Attorney, Agent, or Firm—Dr. Guido Modiano; Dr. Albert Josif

[57] ABSTRACT

An automatic apparatus for scarfing semifinished products in steelworks and the like, comprising a plurality of working members such as cutters or the like, mounted staggered on a frame mobile preferably in a substantially horizontal direction and positionable above at least one piece on which scarfing is to be carried out, a programmer unit which can be preset in relation to the location of the defects to be eliminated in said pieces, means connecting said programmer unit to said mobile frame so as to make said working members act on said defect locations and means for operating said working members and moving said mobile frame.

9 Claims, 6 Drawing Figures

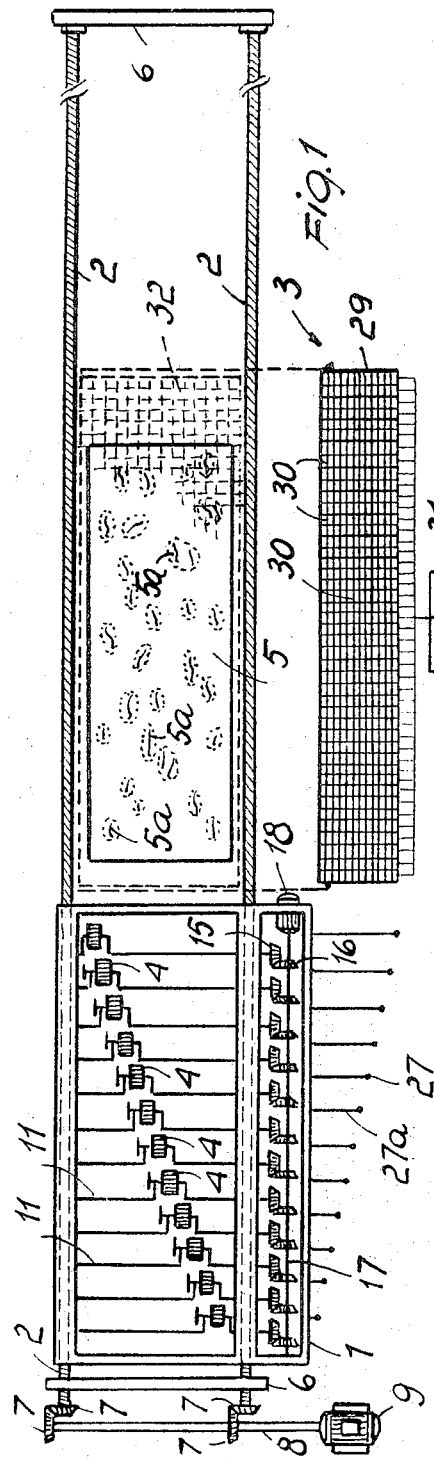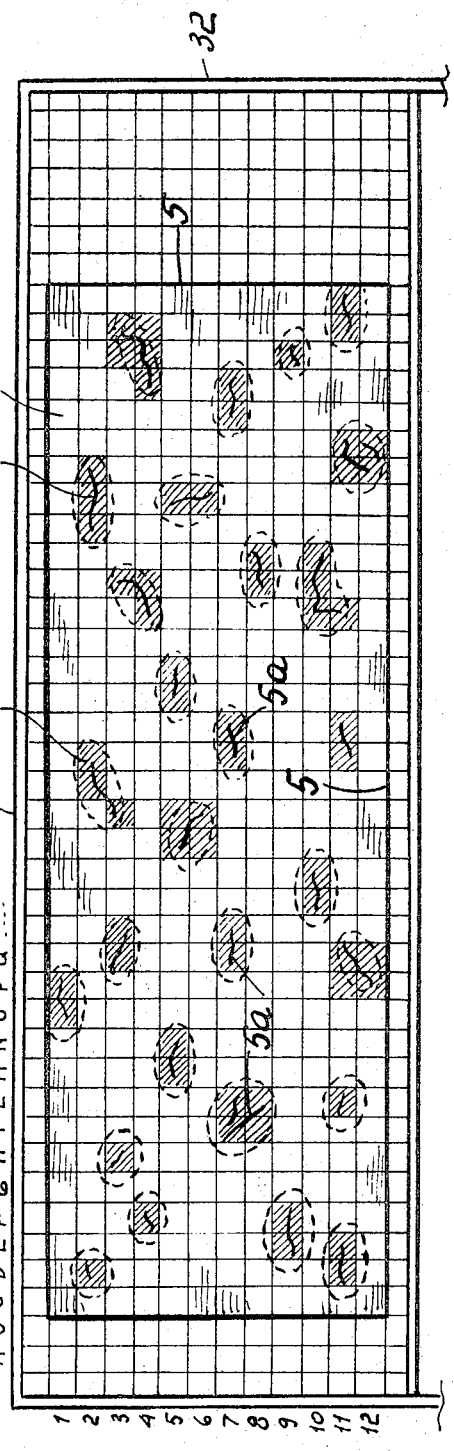

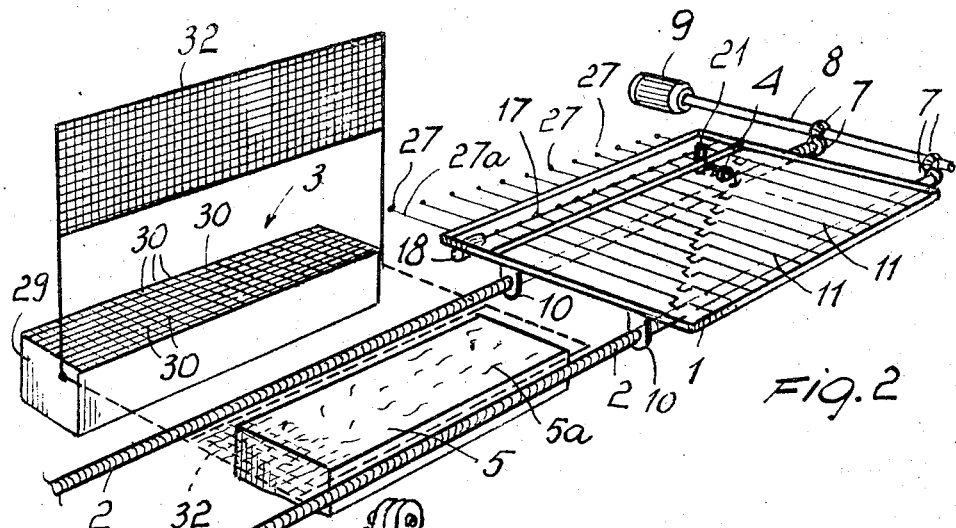
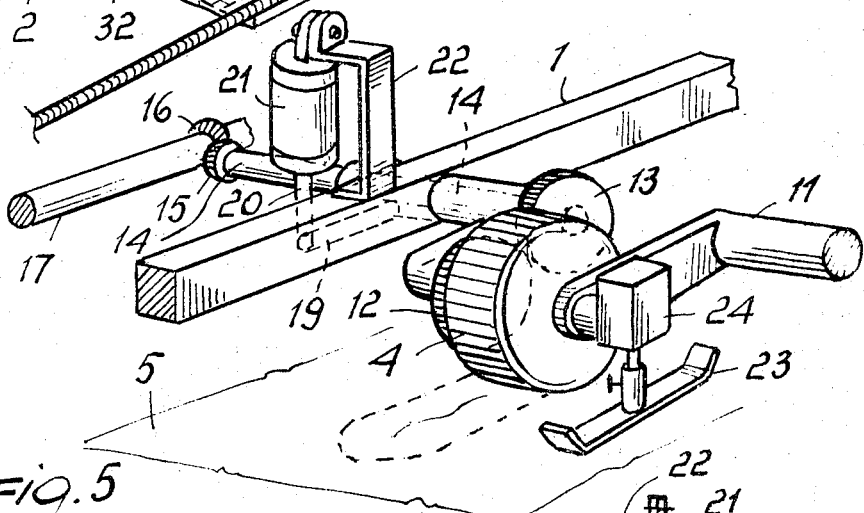
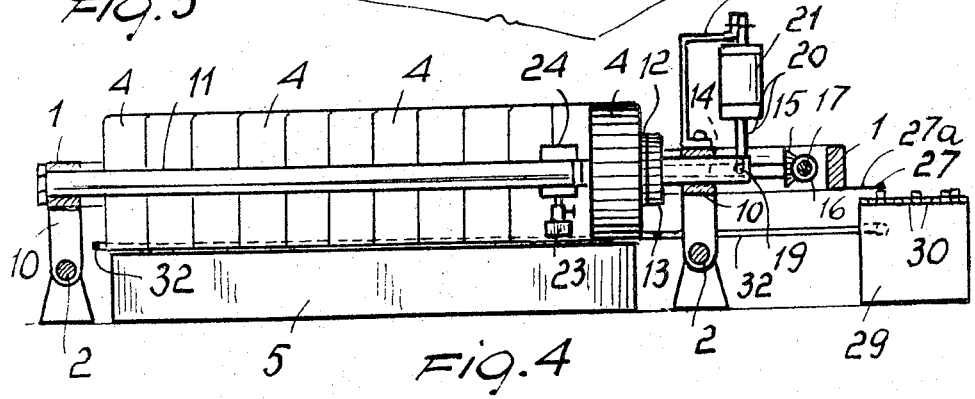

AUTOMATIC APPARATUS FOR SCARFING SEMIFINISHED PRODUCTS

BACKGROUND OF THE INVENTION

The present invention relates to an automatic apparatus for scarfing semifinished products in steelworks and the like.

The products obtained from the roughing mill (commonly called "blooming"), or the semifinished products known as "blooms" and "thick slabs," must be subjected before successive operations to scarfing, or the elimination of surface cracks and defects which are inevitably present on leaving the blooming mill.

The scarfing operation represents a large problem for all steelworks in that it requires the use of specially trained labour which is difficult to find and not very reliable. In fact, the scarfing operation is a laborious, dangerous and difficult operation because of which it is not always possible to find suitable personnel and keep them at this type of work after the lengthy period of training.

In addition to pneumatic chipping, present systems comprise hot scarfing, or the use of oxyacetylene gas torches provided with an auxiliary pipe for feeding a strong jet of oxygen after priming. The scarfing torches are operated manually by the operator close to each surface defect so as to eliminate it by removal of material through oxidation.

A certain ability is necessary on the part of the operator in order to correctly carry out the scarfing as it must lead to the removal of material over a correct length and suitable depth according to the characteristics of the defects, and must leave hollows on the thick slabs or blooms which are perfectly and smoothly connected to the remaining parts of the surfaces which have not been treated, so as to avoid defects during successive rolling.

It should also be remembered that the operator works under very unsatisfactory conditions because of the enormous heat developed, the blinding luminosity of the flame and the ever present danger of molten metal spitting or deviation of the streaks of flame.

In order to obviate the above disadvantages it has been suggested to carry out scarfing with a continuous flame of a size which covers the whole width of the piece to be treated. By means of this system it is possible to carry out the operation automatically, but there is a considerable loss of material in that it is necessary to eliminate a layer of constant thickness over the whole surface of the pieces rather than only at the defects.

It should also be remembered that the residual material from scarfing must be largely scrapped as it consists of oxides which are not reusable.

SUMMARY OF THE INVENTION

The main object of the present invention is to provide an apparatus which allows the elimination of direct manual labour during scarfing operations, leaving only the setting up and supervision to be carried out manually.

A further important object of the invention is to provide an apparatus which is of easy use, high efficiency and reliable operation.

A further object of the invention is to provide an apparatus by means of which loss of material is reduced to a minimum and scarfing residues may be reused.

These and still further objects are attained by the apparatus, according to the invention, which comprises a plurality of working members such as cutters or the like, mounted staggered on a frame mobile preferably in a substantially horizontal direction and positionable above at least one piece on which scarfing is to be carried out, a programmer unit which can be preset in relation to the location of the defects to be eliminated in said pieces, means connecting said programmer unit to said mobile frame so as to make said working members act on said defect locations, and means for operating said working members and moving said mobile frame.

BRIEF DESCRIPTION OF THE DRAWINGS

Further characteristics and advantages of the invention will better appear from the detailed description of a preferred but not exclusive embodiment of an apparatus according to the invention, illustrated by way of example in the accompanying drawings in which:

FIG. 1 is a diagrammatical plan view of the apparatus according to the invention;

FIG. 2 is a diagrammatical perspective view of the same apparatus;

FIG. 4 is a diagrammatical cross-section through the apparatus;

FIG. 5 is a perspective view of a detail of the apparatus;

FIG. 6 is a diagrammatical plan view of the preparatory stage of programming.

DESCRIPTION OF PREFERRED EMBODIMENT

Figure 3:
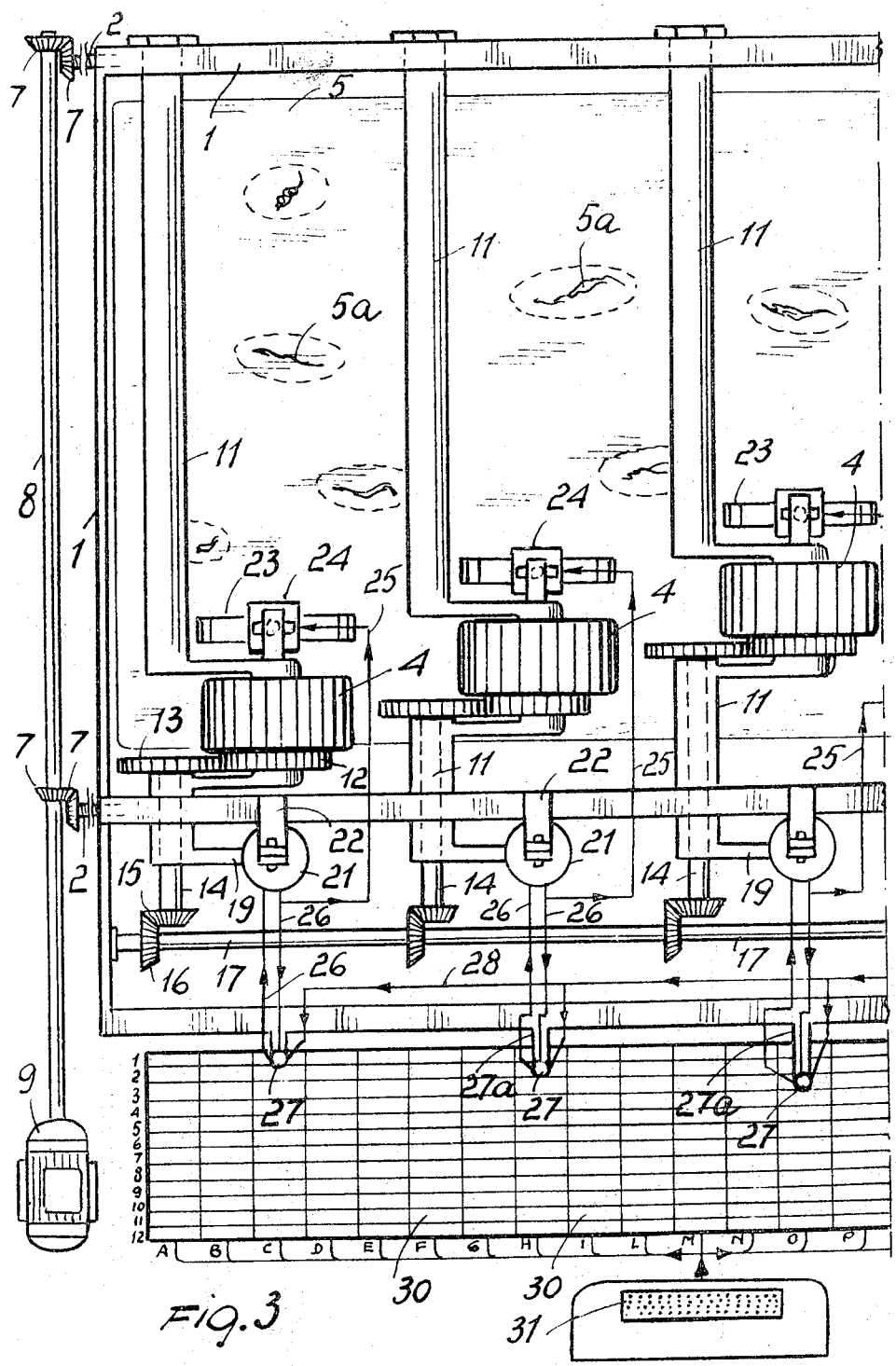
FIG. 3 is a plan view to a larger scale of one part of the apparatus according to the invention.

With reference to the above figures, the apparatus according to the invention for scarfing thick slabs comprises a mobile frame 1 of rectangular configuration which moves along two horizontal parallel rods 2, a programmer unit 3 and a plurality of working tools in form of cutters 4 mounted offset or staggered on the frame 1.

The thick slabs 5 to be subjected to scarfing must be rested on a working surface or plane lower than the threaded rods 2, aligned longitudinally with them and in a central position.

The threaded rods 2 are rotatably supported by end supports 6 (FIG. 1) and are driven by pairs of bevel gears 7 driven by a shaft 8 which is rotated by an electric motor 9. The threaded rods 2 pass through nut screws 10 fixed lowerly to the frame 1 so that this latter moves along said rods when they rotate about their respective axes, the rods defining parallel guides for the frame.

Obviously the frame 1 can be made to move by any other system, for example by predisposing rails and making wheels coupled to the frame 1 run on them.

Each cutter 4 is rotatably mounted on a crankshaft 11 disposed transversally and pivotally supported by the frame 1. In the example shown there are 12 shafts 11 which support the same number of cutters 4 and are disposed parallel to each other.

Each cutter 4 is coaxially rigid with a gear 12 which meshes with another gear 13 keyed to a shaft 14 rotatable coaxially in a section of the shaft 11 and projecting at its end where a bevel gear 15 is keyed, meshing with another bevel gear 16 keyed to a common shaft 17 disposed orthogonally to the crankshafts 11. The shaft 17 is made to rotate by means of an electric motor 18 supported on the frame 1. In this manner the cutters 4 are made to rotate simultaneously by way of the gears 12, 13, 15 and 16 for any angular position of the crankshafts 11.

The cutters 4 are disposed staggered with respect to each other and diagonally to the frame 1 so that they can work along longitudinal strips which are side by side and slightly overlapping, so that the whole of the width of the thick slabs 5 can be surface treated, as will be explained hereinafter.

When at rest the cutters 4 are maintained above the upper surface of the thick slab 5 which rests on the ground and the crankshafts 11 extend substantially horizontally (FIG. 5), whereas during the working phase each cutter 4 is lowered independently of the others until it reaches said surface. To this end, each crankshaft 11 is provided with an arm 19 projecting radially and joined in an articulated manner to the extremity of the rod 20 of a corresponding fluid operated actuation means such as hydraulic cylinder 21 supported in an articulated manner by an arm 22 rigid with the frame 1 (FIG. 5). When the cylinder 21, which is a double acting cylinder, is operated, the corresponding cutter 4 is thus raised or lowered.

In order to adjust the working depth or level of each cutter 4 thus limiting the lowering movement thereof during working, a sliding block 23 is provided at the side of each of them and mounted adjustable in position on the stem of a valve 24 which is supported on the corresponding shaft 11 and connected to the hydraulic circuit by means of a duct 25. This latter duct is connected to one of the two pipes 26 (FIG. 3) which at one end are connected to the hydraulic cylinder 21 and at the other end are connected to a distributor valve 27.

The distributors 27 are fed by means of a pipe 28 connected to a source of compressed fluid (not shown).

The valves 24 are in a closed condition when the corresponding sliding blocks 23 are suspended and open when these sliding blocks are thrust upwards after contact with the surface of the thick slabs 5. The opening of the valves 24 causes a flow of pressure fluid as will be seen hereinafter.

The distributors 27 are projectingly mounted laterally on the frame 1 on corresponding arms 27a of gradually increasing length from one end of said frame to the other. The projecting arms operating the distributors 27 are provided with sliding rollers adapted to engage with respective control members of a programmer unit 3, as will be better seen hereinafter.

This latter comprises a bench 29 on the flat upper surface of which is arranged a plurality actuation members in the form of of small rectangular blocks 30 arranged side by side in a certain number of rows (indicated in FIG. 3 by the side reference numerals 1, 2, 3, 4, 5 ...) and a certain number of columns (indicated by A, B, C, D, E, ... in FIG. 3), these small blocks being able to be moved from a lowered non operative position to a raised operative position by means of corresponding control members, for example hydraulic cylinders or electromagnets operated by means of a keyboard 31 placed on a control panel (FIG. 3).

The rectangular moveable blocks 30 correspond to the meshes of a square mesh grid 32 locateable by the same references as used for the small blocks 30. The frame which supports the grid 32 is connected to the bench 29 and may be overturned so as to superimpose said grid on the thick slab 5 which is to be treated.

The superimposing of the grid 32 on the thick slab 5 as shown in FIG. 6 allows the exact position to be detected of the various defects 5a present on the upper surface of the thick slab 5 and rendered more visible previously by chalk signs made by the inspector responsible for this check, according to usual practice.

In fact, the uniform meshes of the grid (FIG. 6) allow to define the exact position of the defects in terms of coordinate pairs of a coordinate system, in the example show a Cartesian coordinate system. The number of the meshes corresponds to the number of coordinate pairs.

The position of each defect 5a on the thick slab 5 can be set on the programmer unit 3 as each block 30 corresponds to a definite mesh of the grid 32, that is to a coordinate pair.

The arrangement is such that the arms 27a operating the distributors 27 run with the corresponding rollers along the rows of blocks 30 as the frame 1 traverses.

Each distributor 27 runs along the whole of its respective row from one end to the other and acts according to whether the various blocks are in the lowered or raised position. The arms define therefore sensing means for a selective control of the cutters 4.

The operation of the apparatus described above is as follows.

After the grid 32 has been rested on the thick slab 5, the pushbuttons or keys corresponding to the meshes which comprise the defects 5a are pushed on the keyboard 31. FIG. 6 shows by dashed lines that each defect 5a can be contained in one or more meshes that is one or more coordinate pairs and correspondingly one or more pushbuttons will be pushed on the keyboard 31, each pushbutton corresponding to a coordinate pair. Thus in the example shown the pushbuttons corresponding to the positions 2-D (where 2 is the row and D is the column), 11-D, 11-E, 9-E, 9-F, 4-F, 3-H, etc. must be pushed.

This will cause the control members raising the blocks 30 occupying the corresponding positions to operate and to bring these blocks 30 into the operative state.

The programmer unit 3 is thus set and the grid 32 may be removed or turned backwards so as to allow movement of the frame 1, which during this preparatory stage was moved to its limiting position.

The electric motor 9 is switched on and makes the frame 1 move slowly along the threaded rods 2 which rotate about their respective axes. Initially all the cutters 4 are in the raised position in that all the distributors 27 are disposed with their corresponding arms 27a in the lowered position corresponding to the flow of compressed fluid into the lower part of the cylinders 21 with consequent raising of the corresponding pistons connected to the arms 19 by means of the rods 20.

This raised position of the cutters 4 is maintained even when the arms of the distributors 27, when running along the bench 29, encounter blocks 30 in the lowered position that is in a non operative state.

When said arms of the distributors 27 while travelling encounter raised blocks 30 control member of the distributor 27 changes the connections relative to the cylinders 21 because of which the compressed fluid flows to the upper part of these cylinders with consequent descent of the pistons, plus the corresponding cutters 4 because of the connection 19.

Consequently at those blocks 30 which are in raised operative position, the cutters descend until they come into contact with the upper surface of the thick slab 5. As the cutters 4 are constantly rotating, material begins to be removed at the programmed positions as the frame 1 continues to advance. The depth of machining of the cutters 4 is determined by the position of the sliding blocks 23 relative to them, said position being suitably adjustable, on the stem of valve 24. By fixing the sliding blocks 23 in a greater raised position with respect to the lower surface points of the cutters 4, these latter will continue to be lowered and hence the milling will get deeper until the sliding blocks 23 come into contact with the surface of the thick slab 5. When this contact takes place the corresponding sliding block 23 is made to move upwards relative to the cutter 4 which is urged downwardly by piston rod 20, so that the valve 24 is opened and the corresponding duct 25 is connected to atmosphere. In this manner the pressure acting in the upper part of the cylinder 21 is discharged and the pressure of the cutter 4 on the thick slab 5 ceases. The cutter 4 then tends to raise itself because of which at a certain moment the sliding block 23 becomes detached from the upper surface of the thick slab 5 and so causes the valve 24 to close. The pressure in the upper part of the cylinder 21 is thus re-established and consequently the cutter 4 is lowered and continues to remove the material to a desired depth. In substance an equilibrium condition is established in which each cutter 4 carries out a removal operation to a constant depth as established by the adjustment of the corresponding sliding block 23.

When the raised blocks 30 have been passed, the arms of the distributors 27 are again lowered so that compressed fluid is fed into the lower part of the cylinders 21 with consequent raising of the cutters 4 towards the rest position.

In the direction of advancement of the frame 1, various millings will thus be formed in positions corresponding to the programmed zones, these millings beginning and ending smoothly with respect to the upper surface of the thick slab 5 because the lowering and raising of the various cutters 4 takes place gradually as the frame 1 moves.

The millings are made smooth with the surface also in the lateral direction. To this end the cutters 4 are rounded at their lateral edges.

Thus in a single pass a surface machining operation is carried out which removes material at all the defects 5a, with a result similar to that attainable by traditional techniques utilising hot scarfing or the like.

After scarfing on one surface, the thick slab 5 is turned over and the opposing surface is arranged for scarfing in a manner completely analogous to the aforegoing.

For scarfing the lateral surfaces, an assembly comprising one or more cutters may be provided adapted to carry out a scarfing operation in a manner similar to that previously described.

In a modified embodiment, it is possible to remove the material continuously on both lateral surfaces to a certain depth.

Obviously conveyor means may be provided adapted to make the thick slabs 5 advance one after the other to correspond with the apparatus according to the invention.

It is evident that the apparatus for removing surface defects heretofore described may be arranged with suitable modifications for scarfing blooms.

As can be seen, the apparatus according to the invention makes automatic scarfing possible, eliminating direct intervention of labour, so substantially obviating all the disadvantages initially mentioned.

Moreover, by providing a sliding block 23 to the side of each cutter 4, the operation of the cutters 4 is made independent in the sense that each of them may work to a predetermined depth. Such an arrangement means that the scarfing operation can be carried out regularly even on surfaces which are not perfectly flat.

The invention so conceived is susceptible to numerous modifications all of which are to be considered as defined by the following claims.

Thus for example the hydraulic cylinders 21 may be substituted by electromagnetic assemblies or motor assemblies which raise and lower the cutters 4.

In a further example the crankshafts 11 may be eliminated by mounting the frame 1 a plurality of cutting assemblies which move vertically by means of suitable control members.

I claim:

1. An apparatus for removing surface defects from semifinished products, particularly for scarfing metal bodies in steelworks and the like, comprising a working surface supporting said semifinished products, a frame including a plurality of working tools arranged spaced from one another for removing said defects, said working tools being selectively movable between a rest position in which said working tools are spaced from said semifinished products into a working position in which said working tools are operative on said surface of said semifinished products, means for displacing each of said semifinished products and said frame relative to each other into a position in which said frame is arranged above said semifinished products, means for defining coordinate pairs on said surface of said semifinished products and for localizating said defects according to a coordinate system, a programming unit including a control panel provided with a number of control keys corresponding to the number of coordinate pairs for selective actuation according to the coordinates in which defects are detected and a bench having a plurality of actuation members each corresponding in position to one of said control keys, said actuation members being selectively controlled by a corresponding one of said control keys to pass from a non operative state to an operative state, sensing means arranged on said frame for detecting said actuation members which are in said operative state, and control means responsive to said sensing means for the selective control of said working tools.

2. An apparatus as claimed in claim 1, wherein said actuation members comprise a plurality of blocks movable from a lower non operative position into a raised operative position, and wherein said sensing means comprise arms projecting from said frame and provided with rollers for contacting said movable blocks in raised operative position.

3. An apparatus as claimed in claim 1, wherein said means for defining coordinate pairs on said surface of said semifinished products and for localizing said defects according to a coordinate system comprise a grid having a number of uniform meshes corresponding in number to the coordinate pairs, said grid being superimposable to each of said semifinished products.

4. An apparatus as claimed in claim 1, wherein said control means comprise a fluid operated actuation means for each of said working tools for selectively moving said working tools from said rest position into said working position and vice versa, a distributor of pressure fluid arranged on said frame and controlling a corresponding one of said fluid operated actuation means, said distributor having a control member operatively connected to a corresponding one of said sensing means for causing fluid to flow to said fluid operated actuation means and to move said working tools into said working position when said sensing means detect an actuation member in said operative state and for causing fluid to be discharged from said fluid operated actuation means whereby to move said working tools into said rest position when no actuation member in operative state is detected by said sensing means.

5. An apparatus as claimed in claim 1, wherein said control keys and said actuation members are arranged according to a number of rows and of columns, to each of said rows corresponding one of said sensing means and one of said working tools.

6. An apparatus as claimed in claim 1, wherein said frame has a rectangular configuration and said working tools comprise cutters arranged on said frame staggered with respect to each other substantially diagonally to said frame, each of said cutters being adapted to work a section of the width of said semifinished products.

7. An apparatus as claimed in claim 1, wherein said frame is movable on parallel guides above said semifinished products along thereof and said sensing means comprise arms projecting from said frame transverse to the direction of movement thereof, thereby to be actuated by said actuation members while said frame is moving above said semifinished products.

8. An apparatus as claimed in claim 1, wherein said control means further comprise crankshafts pivotally supported by said frame and rotatably carrying said working tools, and members for the limitation of the lowering movement of said working tools from said rest position into said working position, said members including sliding blocks engaging said surface of said semifinished products, said sliding blocks being mounted in adjustable position on said crankshafts.

9. An apparatus as claimed in claim 8, wherein said sliding blocks are operatively connected to respective valve means for stopping said lowering motion of said working tools caused by said fluid operated means when said sliding blocks contact the surface of said semifinished products.

* * * * *